(12) United States Patent
Kobayashi

(10) Patent No.: US 7,445,579 B2
(45) Date of Patent: Nov. 4, 2008

(54) SYSTEM AND METHOD OF COMPENSATING HEATING PERFORMANCE OF CONTINUOUSLY-VARIABLE-TRANSMISSION-EQUIPPED VEHICLE

(75) Inventor: Atsufumi Kobayashi, Kanagawa (JP)

(73) Assignee: Jatco Ltd, Shizuoka (JP)

( * ) Notice: Subject to any disclaimer, the term of this patent is extended or adjusted under 35 U.S.C. 154(b) by 129 days.

(21) Appl. No.: 11/237,903

(22) Filed: Sep. 29, 2005

(65) Prior Publication Data

US 2006/0068971 A1   Mar. 30, 2006

(30) Foreign Application Priority Data

Sep. 30, 2004   (JP) .............................. 2004-289104

(51) Int. Cl.
F16H 61/66 (2006.01)
B60W 10/06 (2006.01)
B60W 10/10 (2006.01)

(52) U.S. Cl. .............................. 477/98; 477/37; 477/44; 477/107

(58) Field of Classification Search .................... 477/98
See application file for complete search history.

(56) References Cited

U.S. PATENT DOCUMENTS 4,713,987 A * 12/1987 Matsumura .................. 477/46
5,146,891 A * 9/1992 Nakazawa et al. .......... 123/325
7,101,311 B2 * 9/2006 Deguchi ....................... 477/98

FOREIGN PATENT DOCUMENTS

| JP | 2000-179670 A | 6/2000 |
| JP | 2004-150475 A | 5/2004 |
| JP | 2004-239334 A | 8/2004 |

\* cited by examiner

Primary Examiner—Sherry Estremsky
Assistant Examiner—Edwin A Young
(74) Attorney, Agent, or Firm—Foley & Lardner LLP

(57) ABSTRACT

A system for compensating a heating performance a motor vehicle with a CVT, wherein the system includes a coolant-temperature sensor for sensing an engine-coolant temperature, and a transmission ECU electronically linked to the CVT and the coolant-temperature sensor, wherein the transmission ECU is so programmed as to: determine whether or not heating-performance compensation is required in accordance with at least the engine-coolant temperature; obtain, if it is determined that heating-performance compensation is required, a target input rotation of the CVT in such a way as to avoid input rotation of the CVT from being below a lower limit value determined to restrain degradation of the drivability and shift quality while compensating the heating performance every vehicle speed; and shift-control the CVT in accordance with the target input rotation.

15 Claims, 5 Drawing Sheets

SYSTEM AND METHOD OF COMPENSATING HEATING PERFORMANCE OF CONTINUOUSLY-VARIABLE-TRANSMISSION-EQUIPPED VEHICLE

BACKGROUND OF THE INVENTION

The present invention relates to a system for compensating a heating performance of a continuously-variable-transmission (CVT)-equipped vehicle, and more particularly, to an improvement of the system which achieves the heating-performance compensation requirement by appropriate shift control of the CVT.

Heating, including air conditioning, in the vehicle cabin is typically carried out by using heat generated by the engine. When the engine-coolant temperature is not yet sufficiently high during engine stop and at the initial stage of engine start, the countermeasures should be taken to make heating quickly effective, particularly, in the severe winter.

A heating-performance compensating system which meets such requirement is disclosed in Japanese document P2000-179670A. This system is constructed such that, in the CVT-equipped vehicle in which engine rotation is converted by the CVT and transmitted to the driving wheels, at presence of the heating-performance compensation requirement, a minimum target input rotating speed a at ordinary temperature is increased by a given value $\Delta N$, which is set as a minimum target input rotating speed $\beta$ at presence of the heating-performance compensation requirement, wherein the CVT is shift-controlled so that an input rotating speed of the CVT does not become smaller than the minimum target input rotating speed $\beta$.

With this system, at presence of the heating-performance compensation requirement, an input rotating speed of the CVT is maintained at a value greater than $\beta$ which is above the minimum target input rotating speed a at ordinary temperature. As a result, a rotating speed of the engine coupled to the input shaft of the CVT can be maintained at a higher value to quickly increase the engine-coolant temperature, obtaining quick enhancement and compensation of the heating performance.

SUMMARY OF THE INVENTION

With the typical system, at presence of the heating-performance compensation requirement, a target input rotating speed of the CVT is increased by a given value $\Delta N$ with respect to the minimum target input rotating speed $\alpha$ at ordinary temperature over the entire vehicle-speed range. However, such countermeasures raise the following problem.

In most times, the minimum target input rotating speed of the CVT which meets the heating-performance compensation requirement does not vary linearly with respect to the vehicle speed, and varies curvedly with respect thereto. As a result, the minimum target input rotating speed $\beta$ at presence of the heating-performance compensation requirement coincides with the minimum target input rotating speed of the CVT which meets the heating-performance compensation requirement at a specific vehicle speed only. At a vehicle speed in the neighborhood of this specific vehicle speed, the minimum target input rotating speed $\beta$ may be too high or too low with respect to the heating-performance compensation requirement.

In the vehicle-speed range in which the minimum target input rotating speed $\beta$ at presence of the heating-performance compensation requirement is too high with respect to the heating-performance compensation requirement, an increase in engine speed greater than necessary causes degradation of the drivability and shift quality and/or occurrence of noise. On the other hand, in the vehicle-speed range in which the minimum target input rotating speed $\beta$ at presence of the heating-performance compensation requirement is too low with respect to the heating-performance compensation requirement, the heating performance cannot be compensated as required, resulting in less comfortable space of the vehicle.

It is, therefore, an object of the present invention to provide a system and method of compensating a heating performance of a CVT-equipped vehicle, which allow proper and correct control for heating-performance compensation without any excess or shortage.

Generally, the present invention provides a system for compensating a performance of heating of a motor vehicle with a CVT, the heating being carried out using heat generated by an engine, wherein the system comprises: a coolant-temperature sensor which senses an engine-coolant temperature; and a transmission electronic control unit (ECU) electronically linked to the CVT and the coolant-temperature sensor, wherein the transmission ECU is so programmed as to: determine whether or not a compensation of the performance of heating is required in accordance with at least the engine-coolant temperature; obtain, if it is determined that the compensation of the performance of heating is required, a target input rotation of the CVT in such a way as to avoid an input rotation of the CVT from being below a lower limit value determined to restrain degradation of a drivability and a shift quality while compensating the performance of heating every vehicle speed; and shift-control the CVT in accordance with the target input rotation.

A main feature of the present invention lies in providing a method of compensating a performance of heating of a motor vehicle with a continuously variable transmission (CVT), the heating being carried out using heat generated by an engine, wherein the method comprises: sensing an engine-coolant temperature; determining whether or not a compensation of the performance of heating is required in accordance with at least the engine-coolant temperature; obtaining, if it is determined that the compensation of the performance of heating is required, a target input rotation of the CVT in such a way as to avoid an input rotation of the CVT from being below a lower limit value determined to restrain degradation of a drivability and a shift quality while compensating the performance of heating every vehicle speed; and shift-controlling the CVT in accordance with the target input rotation.

BRIEF DESCRIPTION OF THE DRAWINGS

The other objects and features of the present invention will become apparent from the following description with reference to the accompanying drawings, wherein.

DETAILED DESCRIPTION OF THE INVENTION

Figure 1:
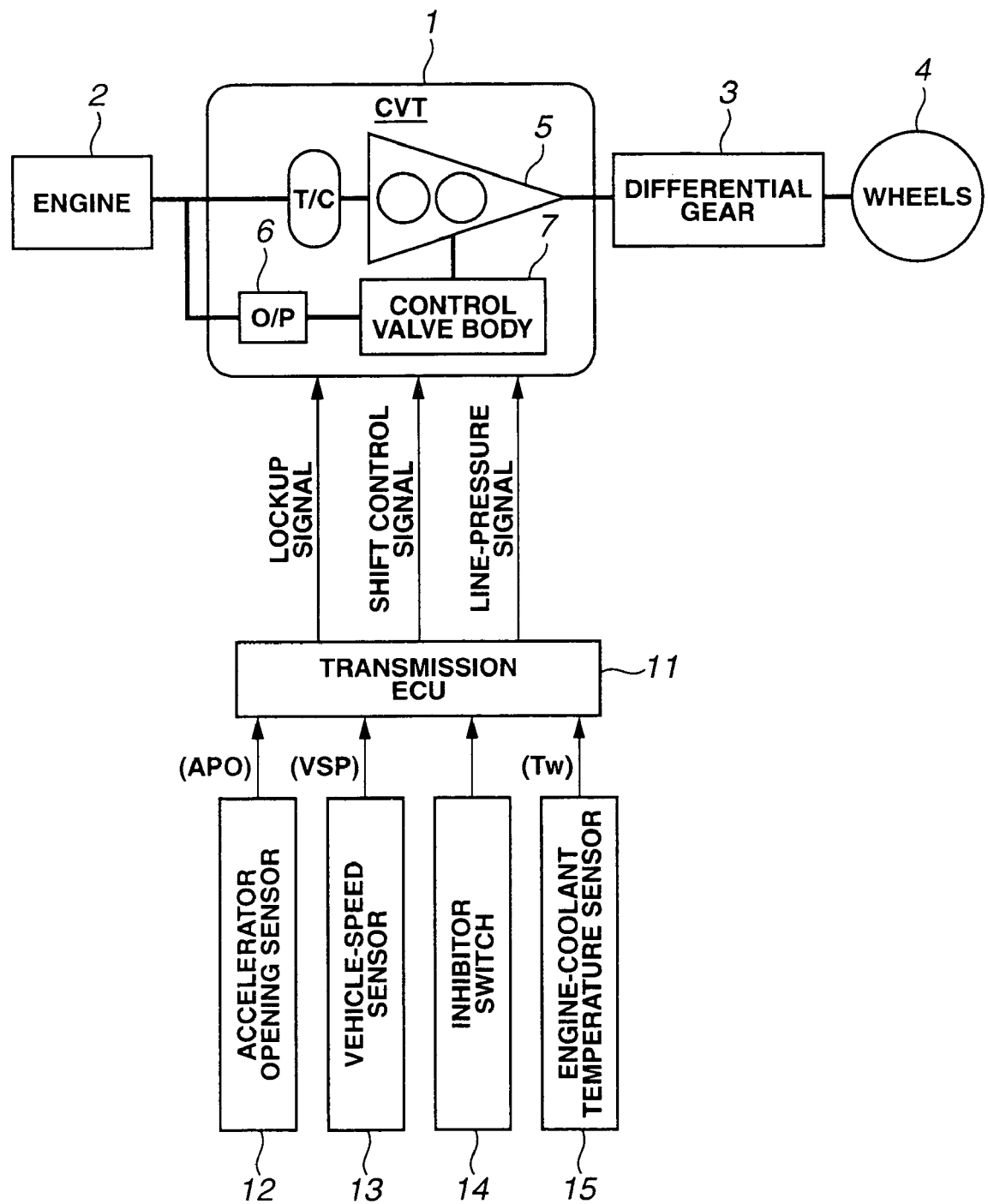
FIG. 1 is a block diagram showing a power train and control system of the CVT-equipped vehicle to which the present invention is applied.

Referring to the drawings, a description will be made about the embodiment of a system for compensating a heating performance of a CVT-equipped vehicle. Referring to FIG. 1, the power train of the CVT-equipped vehicle comprises a CVT 1 such as V-belt CVT or toroidal CVT, an engine 2, a differential gear 3, and driving wheels 4. The CVT 1 is constructed so that its input shaft is coupled to an output shaft of the engine 2 through a torque converter T/C so as to receive engine rotation, which is provided under stepless shift ensured by a stepless shift mechanism 5. Converted output of the CVT 1 is provided to the driving wheels 4 via the differential gear 3 to drive the wheels 4, thus cruising the vehicle.

The CVT 1 further comprises an engine-driven oil pump 6 and a control valve body 7 for shift-controlling the stepless shift mechanism 5 using as a medium hydraulic oil derived from the oil pump 6. Shift control of the CVT 1 through the control valve body 7 is carried out by a transmission electronic control unit (ECU) 11. For that purpose, the transmission ECU 11 receives a signal of an accelerator opening sensor 12 for sensing an accelerator-pedal depression amount (accelerator opening) APO, a signal of a vehicle-speed sensor 13 for sensing a vehicle speed VSP, a signal of an inhibitor switch 14 for detecting a selected range such as P, R, N, D or L range of the CVT 1 which a driver commands through a shift lever, and a signal of a coolant-temperature sensor 15 for sensing an engine-coolant temperature Tw.

The transmission ECU 11 carries out well-known computation in accordance with information input from the sensors to ensure shift control, the outline of which is described hereafter. First, an optimum line pressure for current cruising conditions is determined in accordance with the accelerator opening APO, vehicle speed VSP, and selected range to provide its signal to a line-pressure solenoid, not shown, of the control valve body 7. In response to this signal, the line-pressure solenoid adjusts hydraulic oil derived from the oil pump 6 at the pressure corresponding to the signal, which serves as source pressure for shift control.

Figure 3:
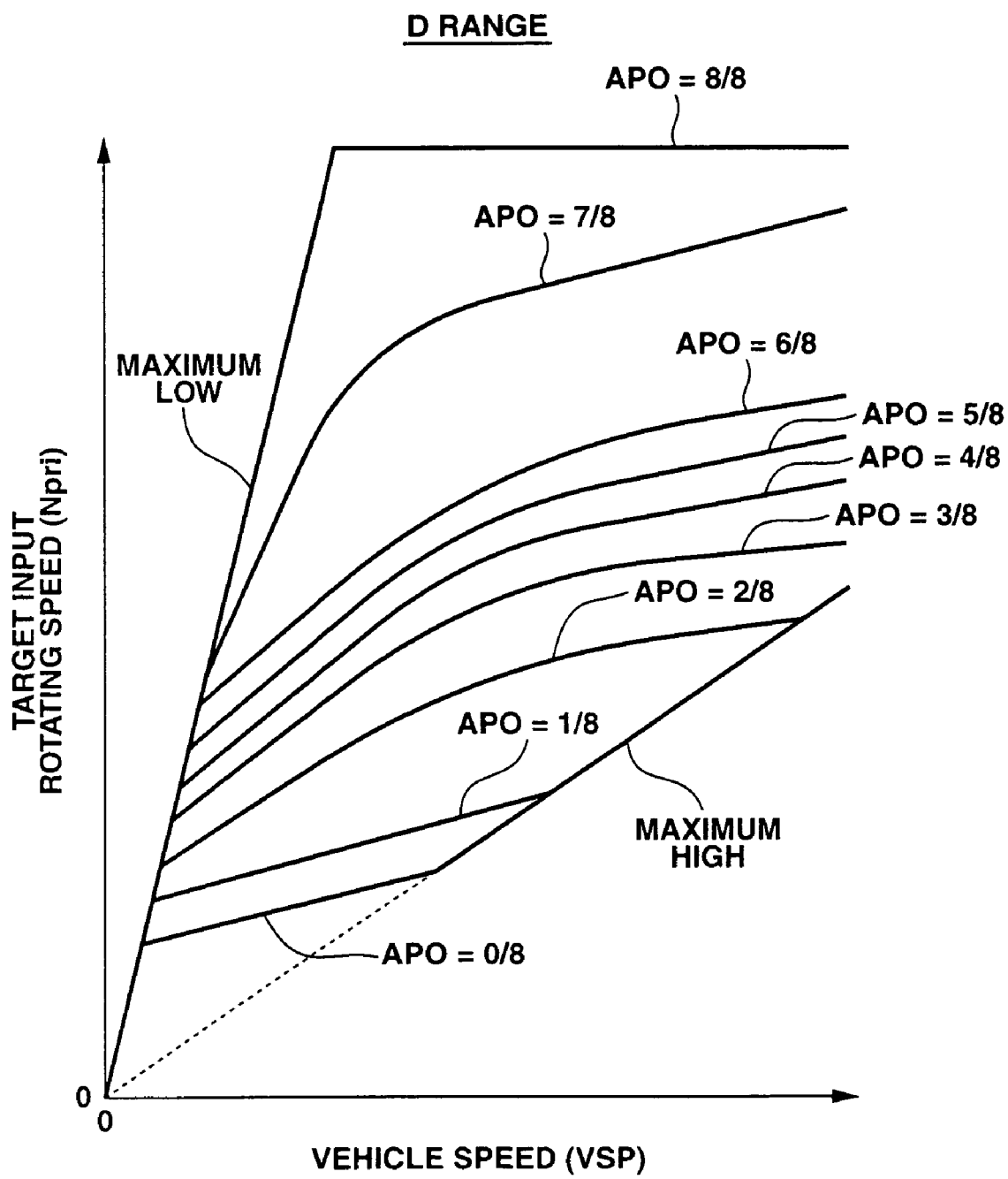
FIG. 3 is a graph showing a shift map at ordinary shift control of the CVT.

Further, the transmission ECU 11 calculates a target input rotating speed Npri of the CVT 1 in accordance with the accelerator opening APO, vehicle speed VSP, and selected range. Referring to FIG. 3, when the shift range is D range, for example, the target rotating speed Npri is obtained out of the accelerator opening APO and the vehicle speed VSP based on a predetermined shift map as shown in FIG. 3. And a shift control signal for achieving the target rotating speed Npri is provided to a shift actuator such as a stepping motor, not shown, in the control valve body 7. It is noted that the target rotating speed Npri divided by an output rotating speed is a target shift ratio. The shift actuator carries out through a shift control valve, not shown, in the control valve body 7 conversion of the CVT 1 to the target rotating speed Npri (target shift ratio). When achieving the target rotating speed Npri, shift is terminated to maintain the target rotating speed Npri.

Furthermore, the transmission ECU determines in accordance with the accelerator opening APO, vehicle speed VSP, and selected range whether or not the torque converter T/C should be put in the lockup state in which their input/output elements (pump impeller and turbine runner) are coupled directly, or in the converter state in which the direct coupling is released. And a corresponding lockup signal is provided to a lockup solenoid, not shown, in the control valve body 7. The lockup solenoid puts through a lockup control valve, not shown, in the control valve body 7 the torque converter T/C in the lockup state or in the converter state.

Figure 2:
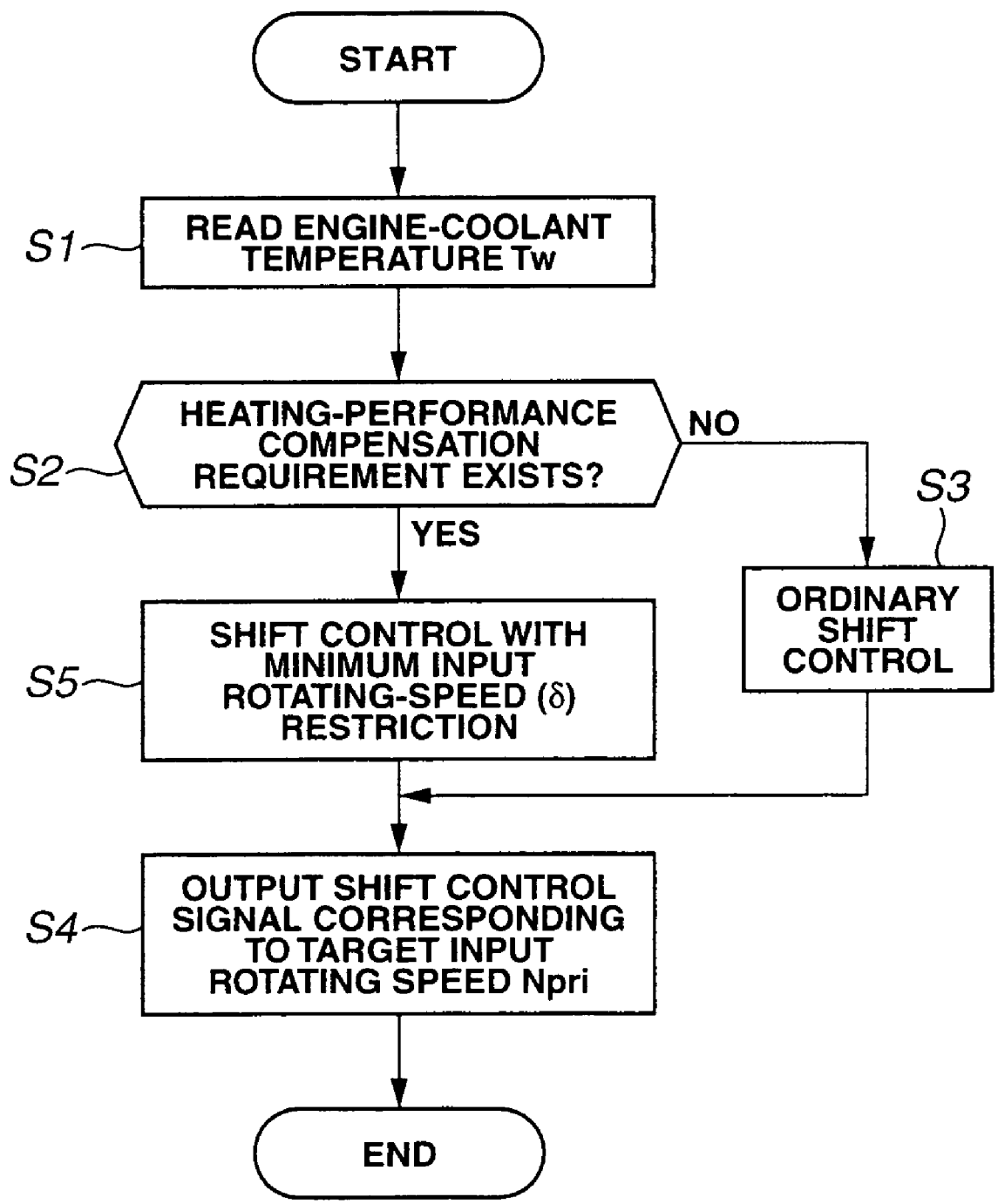
FIG. 2 is a flowchart showing operation of the embodiment.

Referring to FIG. 2, in addition to the shift control at ordinary time, the transmission ECU 11 carries out a control program as shown in FIG. 2 to ensure shift control at presence of heating-performance compensation requirement, which the present invention targets. At a step S1, read is engine-coolant temperature Tw sensed by the coolant-temperature sensor 15 shown in FIG. 1. At a subsequent step S2, it is determined whether or not the heating-performance compensation requirement exists in accordance with the engine-coolant temperature Tw and a difference between the engine-coolant temperature Tw and the outside-air temperature as occasion arises. At the step S2, if it is determined that no heating-performance compensation requirement exists, flow proceeds to a step S3 where the shift control at ordinary time is carried out. Then, at a step S4, a shift control signal corresponding to the target rotating speed Npri (target shift ratio) is provided to the shift actuator. On the other hand, at the step S2, if it is determined that the heating-performance compensation requirement exists, flow proceeds to a step S5 where shift control at presence of heating-performance compensation requirement is carried out as follows.

Figure 4:
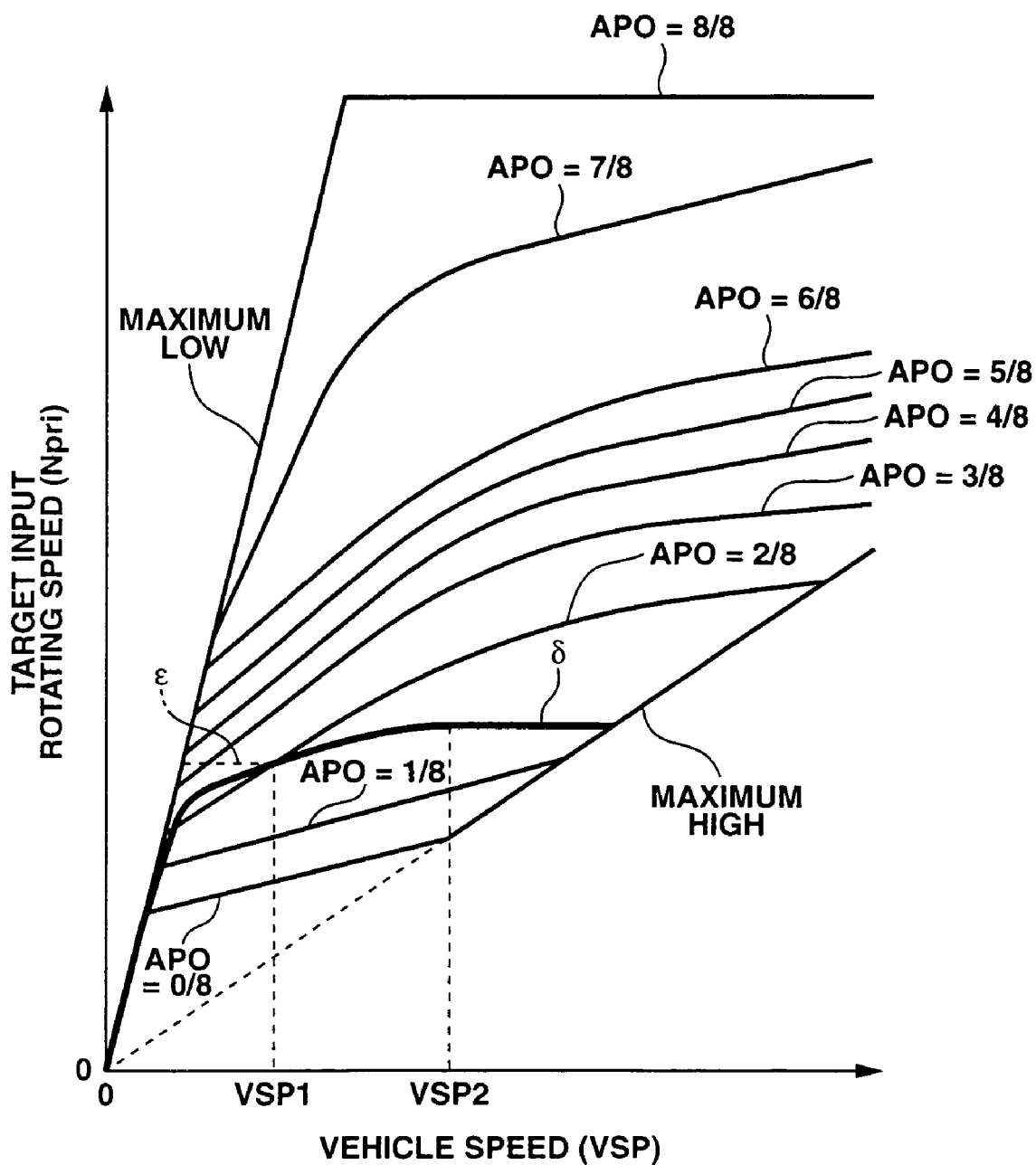
FIG. 4 is a graph similar to FIG. 3, showing a shift map at heating-performance compensation of the CVT.

When carrying out shift control at presence of heating-performance compensation requirement, a D-range shift control map at presence of heating-performance compensation requirement as shown in FIG. 4 is used in place of the D-range shift control map at ordinary time as shown in FIG. 3. Referring to FIG. 4, the D-range shift control map at presence of heating-performance compensation requirement is obtained by adding a lower limit value data σ of the input rotating speed determined for carrying out heating-performance compensation to the same map as the D-range shift control map at ordinary time as shown in FIG. 3. This lower limit value data σ is a lower limit value determined to restrain degradation of the drivability and shift quality while compensating the heating performance every vehicle speed. Specifically, in the ordinary vehicle-speed range in which the vehicle speed VSP lies between a first boundary vehicle speed VSP1 (40 Km/h) and a second boundary vehicle speed VSP2 (70 Km/h), for example, the lower limit value data σ is determined to maximally achieve heating-performance compensation. In the high vehicle-speed range above the ordinary vehicle-speed range, the lower limit value data σ is determined to have a value equal to a lower limit value of the second boundary vehicle speed VSP2 between the ordinary vehicle-speed range and the high vehicle-speed range over the entire vehicle-speed range so as to restrain degradation of the drivability while compensating the heating performance. And in the low vehicle-speed range below the ordinary vehicle-speed range, the lower limit value data σ is determined to gradually decrease with reduction in the vehicle speed from a lower limit value of the first boundary vehicle speed VSP1 between the ordinary vehicle-speed range and the low vehicle-speed range so as to ensure smooth shift.

The reason why the lower limit value data σ of the input rotating speed for heating-performance compensation in the ordinary vehicle-speed range (VSP1 (40 Km/h) to VSP2 (70 Km/h)) is determined to maximally achieve heating-performance compensation is that this vehicle-speed range is a vehicle-speed range which is the highest in service frequency due to its use in 10-15 modes and in which heating-performance compensation is regarded as the most important.

Further, the reason why the lower limit value data σ of the input rotating speed for heating-performance compensation in the high vehicle-speed range is kept at a value equal to a lower limit value of the second boundary vehicle speed VSP2 between the ordinary vehicle-speed range and the high vehicle-speed range over the entire vehicle-speed range is as follows. In terms of heating-performance compensation only, the lower limit value data σ may be lowered as the vehicle speed VSP becomes higher since the input rotating speed is high per se in the high vehicle-speed range. However, if the lower limit value data σ in the high vehicle-speed range is lowered as the vehicle speed VSP becomes higher, greater engine brake takes hold during transition to coasting in the high vehicle-speed range due to downshift tendency that the input rotating speed increases with reduction in the vehicle speed, causing degradation of the drivability and occurrence of noise due to increase in engine speed. Thus, considering such problems, the lower limit value data σ in the high vehicle-speed range is determined to have a value equal to a lower limit value of the second boundary vehicle speed VSP2 between the ordinary vehicle-speed range and the high vehicle-speed range over the entire vehicle-speed range.

Furthermore, the reason why the lower limit value data σ of the input rotating speed for heating-performance compensation in the low vehicle-speed range is determined to gradually decrease with reduction in the vehicle speed from a lower limit value of the first boundary vehicle speed VSP1 between the ordinary vehicle-speed range and the low vehicle-speed range is as follows. In terms of heating-performance compensation only, the lower limit value data σ in the low vehicle-speed range should be kept at a value equal to a lower limit value of the first boundary vehicle speed VSP1 as shown by broken line ε in FIG. 4. However, if the lower limit value data σ is determined in such a way, at the time of shift from the maximum low shift ratio, shift is carried out in one stoke to the shift ratio on broken line ε causing occurrence of a shock due to sudden change in inertia.

Then, in the embodiment, considering this problem, the lower limit value data σ in the low vehicle-speed range is determined to gradually decrease with reduction in the vehicle speed from a lower limit value of the first boundary vehicle speed VSP1 so as to ensure smooth shift even at the time of shift from the maximum low shift ratio.

Returning to FIG. 2, at the step S5 which is carried out if it is determined at the step S2 that the heating-performance compensation requirement exists, a signal indicative of the target input rotating speed Npri (target shift ratio) is obtained to shift-control the CVT 1 in the aforementioned way while avoiding the transmission input rotating speed from being below the lower limit value data σ of the input rotating speed for heating-performance compensation in FIG. 4. At the subsequent step S4, a shift control signal corresponding to the signal indicative of the target input rotating speed Npri is provided to the shift actuator. In the illustrative embodiment, when the heating-performance compensation requirement exists, the CVT 1 is shift-controlled in such as way as to avoid input rotation of the CVT 1 from being below the lower limit value σ (refer to FIG. 4) determined to restrain degradation of the drivability and shift quality while compensating the heating performance every vehicle speed. Therefore, input rotation of the CVT 1 and thus engine rotation will not be below the lower limit value σ for restraining degradation of the drivability and shift quality while compensating the heating performance every vehicle speed, resulting in not only possible restraint in degradation of the drivability and shift quality while compensating the heating performance every vehicle speed, but achievement of proper and correct transmission input rotation with respect to a rotating speed required therefore without any excess or shortage. As a consequence, transmission input rotation at presence of heating-performance compensation requirement may not be too high or too low with respect to the heating-performance compensation requirement, allowing not only resolution of the problem raise when transmission input rotation is too high, i.e. problem of degradation of the drivability and shift quality and/or occurrence of large noise due to increase in transmission input rotation greater than necessary, but resolution of the problem raised when transmission input rotation is too low, i.e. problem of impossible compensation of the heating performance as required and thus less comfortable space of the vehicle.

Further, in the illustrative embodiment, in the ordinary vehicle-speed range, the lower limit value σ for heating-performance compensation of the input rotating speed is determined to maximally achieve heating-performance compensation. Thus, in the ordinary vehicle-speed range in which heating-performance compensation is regarded as important, heating-performance compensation can be ensured as required. Moreover, in the high vehicle-speed range above the ordinary vehicle-speed range, the lower limit value σ is determined to have a value equal to a lower limit value of the second boundary vehicle speed between the ordinary vehicle-speed range and the high vehicle-speed range over the entire vehicle-speed range. Thus, a problem of degradation of the drivability and occurrence of noise due to excessive engine brake can be avoided while compensating the heating performance. Moreover, in the lower vehicle-speed range below the ordinary vehicle-speed range, the lower limit value σ is determined to gradually decrease with reduction in the vehicle speed from a lower limit value of the first boundary vehicle speed between the ordinary vehicle-speed range and the low vehicle-speed range. Thus, a problem of occurrence of an inertia shock can be avoided through non-abrupt but smooth shift even when shift is carried out from the maximum low shift ratio.

Figure 5:
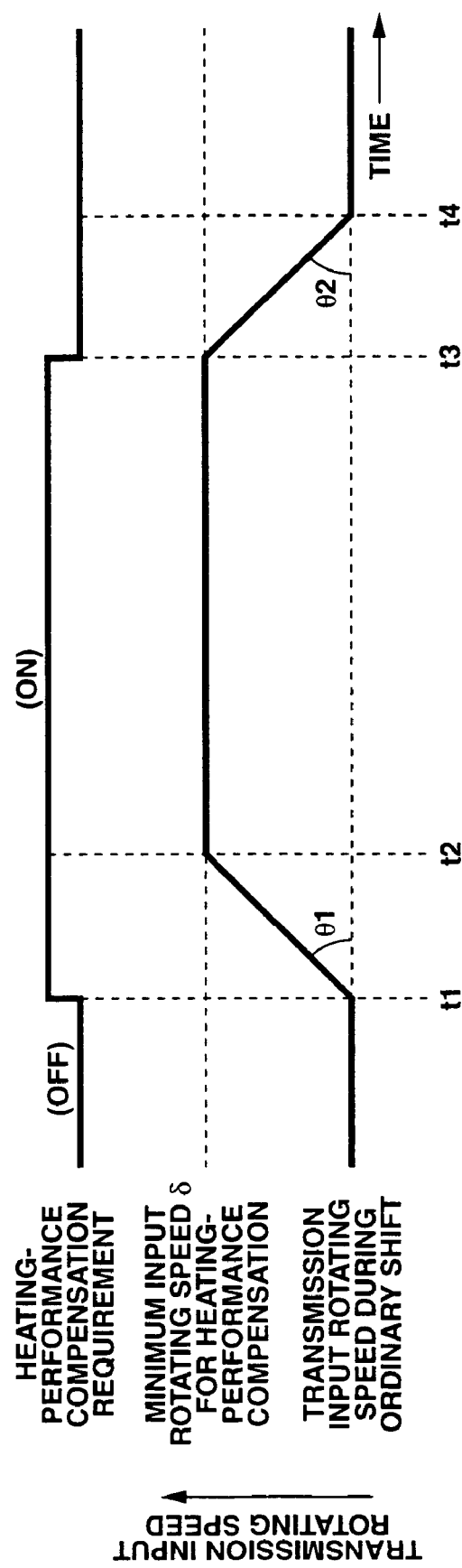
FIG. 5 is a time chart showing a time-series change in input rotating speed of the CVT when stepless shift control is carried out for heating-performance compensation.

According to the foregoing, shift control is such that a transmission input rotating speed increases sharply immediately after the heating-performance compensation requirement occurs, and it decreases sharply immediately after the heating-performance compensation requirement disappears, resulting in possible occurrence of a shock. Referring to FIG. 5, in the illustrative embodiment, the following transition control of the CVT 1 is preferably carried out to solve this problem. Specifically, at instant t1 when the heating-performance compensation requirement occurs, without increasing at one stroke a transmission input rotating speed from the rotating speed at ordinary shift to the minimum input rotating speed σ for heating-performance compensation, a transmission input rotating speed is gradually increased at a given gradient θ1 to attain the minimum input rotating speed σ at instant t2. And at instant t3 when the heating-performance compensation disappears, without decreasing at one stroke a transmission input rotating speed from the minimum input rotating speed σ for heating-performance compensation to the rotating speed at ordinary shift4, a transmission input rotating speed is gradually decreased at a given gradient θ2 to attain the input rotating speed at ordinary shift at instant t4. According to this transition control, when the heating-performance compensation requirement occurs or disappears, shift is not carried out to cause sudden change in transmission input rotating speed, allowing a reduction in shift shock.

Having described the present invention in connection with the illustrative embodiment, it is noted that the present invention is not limited thereto, and various changes and modifications can be made without departing from the scope of the present invention.

The entire teachings of Japanese Patent Application 2004-289104 filed Sep. 30, 2004 are hereby incorporated by reference.

What is claimed is:

1. A system for compensating a performance of heating of a motor vehicle with a continuously variable transmission (CVT), the heating being carried out using heat generated by an engine, the system comprising:
   a coolant-temperature sensor which senses an engine-coolant temperature; and
   a transmission electronic control unit (ECU) electronically linked to the CVT and the coolant-temperature sensor, the transmission ECU being so programmed as to:
   determine whether or not a compensation of the performance of heating is required in accordance with at least the engine-coolant temperature;
   obtain, if it is determined that the compensation of the performance of heating is required, a target input rotation of the CVT in such a way as to avoid an input rotation of the CVT from being below a lower limit value which is determined to restrain degradation of a drivability and a shift quality while compensating the performance of heating in accordance with a vehicle speed, and which is larger than a lower limit value when the compensation of the performance of heating is not required; and
   shift-control the CVT in accordance with the target input rotation.

2. The system as claimed in claim 1, wherein, in an ordinary vehicle-speed range, the lower limit value of the input rotation is determined to maximally achieve the compensation of the performance of heating.

3. The system as claimed in claim 1, wherein, in a low vehicle-speed range below an ordinary vehicle-speed range, the lower limit value of the input rotation is determined to gradually decrease with reduction in the vehicle speed from a lower limit value of the first boundary vehicle speed between the ordinary vehicle-speed range and the low vehicle-speed range so as to ensure smooth shift.

4. The system as claimed in claim 1, wherein, in a high vehicle-speed range above an ordinary vehicle-speed range, the lower limit value of the input rotation is determined to have a value equal to a lower limit value of a second boundary vehicle speed between the ordinary vehicle-speed range and the high vehicle-speed range over an entire vehicle-speed range so as to restrain degradation of the drivability while compensating the performance of heating.

5. The system as claimed in claim 1, wherein when a requirement of the compensation of the performance of heating occurs and/or disappears, a change in the input rotation is gradually carried out with a given time constant.

6. A method of compensating a performance of heating of a motor vehicle with a continuously variable transmission (CVT), the heating being carried out using heat generated by an engine, the method comprising:
   sensing an engine-coolant temperature;
   determining whether or not a compensation of the performance of heating is required in accordance with at least the engine-coolant temperature;
   obtaining, if it is determined that the compensation of the performance of heating is required, a target input rotation of the CVT in such a way as to avoid an input rotation of the CVT from being below a lower limit value which is determined to restrain degradation of a drivability and a shift quality while compensating the performance of heating in accordance with a vehicle speed, and which is larger than a lower limit value when the compensation of the performance of heating is not required; and
   shift-controlling the CVT in accordance with the target input rotation.

7. The method as claimed in claim 6, wherein, in an ordinary vehicle-speed range, the lower limit value of the input rotation is determined to maximally achieve the compensation of the performance of heating.

8. The method as claimed in claim 6, wherein, in a low vehicle-speed range below an ordinary vehicle-speed range, the lower limit value of the input rotation is determined to gradually decrease with reduction in the vehicle speed from a lower limit value of the first boundary vehicle speed between the ordinary vehicle-speed range and the low vehicle-speed range so as to ensure smooth shift.

9. The method as claimed in claim 6, wherein, in a high vehicle-speed range above an ordinary vehicle-speed range, the lower limit value of the input rotation is determined to have a value equal to a lower limit value of a second boundary vehicle speed between the ordinary vehicle-speed range and the high vehicle-speed range over an entire vehicle-speed range so as to restrain degradation of the drivability while compensating the performance of heating.

10. The method as claimed in claim 6, wherein when a requirement of the compensation of the performance of heating occurs and/or disappears, a change in the input rotation is gradually carried out with a given time constant.

11. A motor vehicle, comprising:
    a continuously variable transmission (CVT); and
    a system for compensating a performance of heating of the motor vehicle, the heating being carried out using heat generated by an engine, the system comprising:
    a coolant-temperature sensor which senses an engine-coolant temperature; and
    a transmission electronic control unit (ECU) electronically linked to the CVT and the coolant-temperature sensor, the transmission ECU being so programmed as to:
    determine whether or not a compensation of the performance of heating is required in accordance with at least the engine-coolant temperature;
    obtain, if it is determined that the compensation of the performance of heating is required, a target input rotation of the CVT in such a way as to avoid an input rotation of the CVT from being below a lower limit value which is determined to restrain degradation of a drivability and a shift quality while compensating the performance of heating in accordance with a vehicle speed, and which is larger than a lower limit value when the compensation of the performance of heating is not required; and
    shift-control the CVT in accordance with the target input rotation.

12. The motor vehicle as claimed in claim 11, wherein, in an ordinary vehicle-speed range, the lower limit value of the input rotation is determined to maximally achieve the compensation of the performance of heating.

13. The motor vehicle as claimed in claim 11, wherein, in a low vehicle-speed range below an ordinary vehicle-speed range, the lower limit value of the input rotation is determined to gradually decrease with reduction in the vehicle speed from a lower limit value of the first boundary vehicle speed between the ordinary vehicle-speed range and the low vehicle-speed range so as to ensure smooth shift.

14. The motor vehicle as claimed in claim 11, wherein, in a high vehicle-speed range above an ordinary vehicle-speed range, the lower limit value of the input rotation is determined to have a value equal to a lower limit value of a second boundary vehicle speed between the ordinary vehicle-speed range and the high vehicle-speed range over an entire vehicle-speed range so as to restrain degradation of the drivability while compensating the performance of heating.

15. The motor vehicle as claimed in claim 11, wherein when a requirement of the compensation of the performance of heating occurs and/or disappears, a change in the input rotation is gradually carried out with a given time constant.

* * * * *